C. W. HODGES.
ANTISKID DEVICE.
APPLICATION FILED MAR. 1, 1917.
1,355,972.
Patented Oct. 19, 1920.
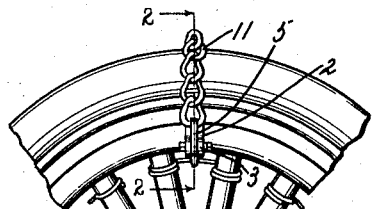
Fig. I.
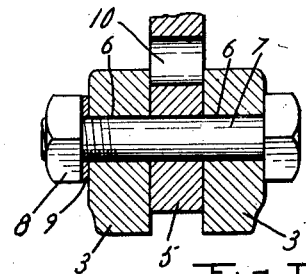
Fig. III.
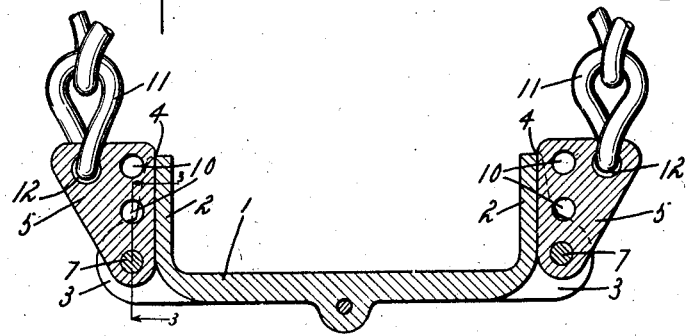
Fig. II.
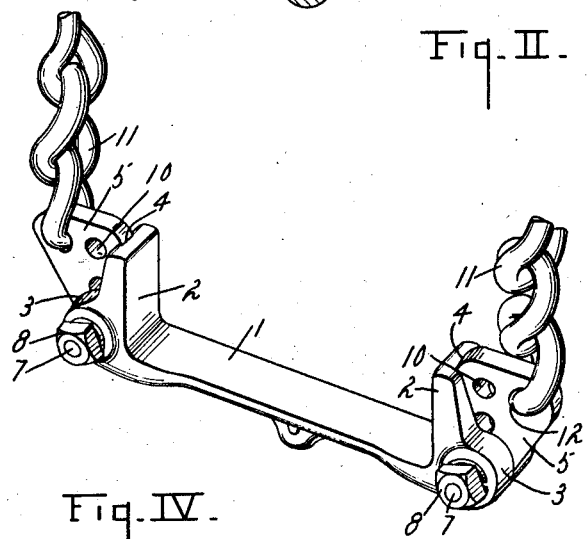
Fig. IV.
WITNESSES:
Lenn Gilman
Luther Blake
INVENTOR.
CHAUNCEY W. HODGES.
BY Chappell & Earl
ATTORNEYS.

UNITED STATES PATENT OFFICE.

CHAUNCEY W. HODGES, OF GRAND RAPIDS, MICHIGAN.

ANTISKID DEVICE.

1,355,972.     Specification of Letters Patent.     Patented Oct. 19, 1920.

Application filed March 1, 1917. Serial No. 151,732.

*To all whom it may concern:*

Be it known that I, CHAUNCEY W. HODGES, a citizen of the United States, residing at Grand Rapids, county of Kent, State of Michigan, have invented certain new and useful Improvements in Antiskid Devices, of which the following is a specification.

This invention relates to anti-skid devices.

The object of the invention is to provide an anti-skid device for the wheels of trucks and heavy motor vehicles which may be easily and quickly adjusted to fit tires of varying sizes as manufactured or as reduced by wear.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a side elevation of an automobile truck wheel equipped with one of my anti-skid devices, portions of the wheel being broken away.

Fig. II is an enlarged longitudinal section through the yoke or body portion of my device on a line corresponding to line 2—2 of Fig. I, the tread chain being shown partly broken away.

Fig. III is an enlarged detail section taken on a line corresponding to line 3—3 of Fig. II.

Fig. IV is a perspective view of my improved device with portions of the chain attached thereto.

In the drawing similar reference characters refer to similar parts throughout the several views, and the sectional views are taken looking in the direction of the little arrows at the ends of the section lines.

My improved device comprises a yoke comprising a cross bar 1 adapted to engage the inner side of a felly and provided with outwardly extending arms 2 at each end thereof. The arms 2 are each provided with a pair of spaced laterally projecting lugs 3 which form groove-like seats 4 for the reception of the flat triangular shaped coupling members 5. Each pair of lugs 3 is provided with alined openings 6 for the bolts 7, having a nut 8 and a lock nut 9. Adjacent the side of the coupling member 5, which contacts with the outer face of the bracket 2, are a plurality of holes 10 which coöperate with the bolt 7 to adjust the chains 11 to various sized tires or wheels. The ends of the chain 11 are secured through holes 12 in the outer portion of the coupling member 5.

The operation of my improved anti-skid device will be apparent from the above description.

When it is desired to adjust the device to a tire of different size it is merely necessary to remove one, or both, of the bolts 7, bring the proper hole 10 in register with the hole 6 and again insert the bolt 7.

Having thus described my invention, what I claim as new and desire to secure by Letters Patent, is:

1. In a structure of the class described, the combination of a yoke adapted to embrace a felly and comprising a transverse bar provided with outwardly extending arms having spaced laterally projecting lugs provided with alined bolt holes and forming groove-like coupling member seats, coupling member attaching bolts arranged through said lugs, flat triangular tread coupling members arranged in said seats and provided with a plurality of holes adapted to receive said attaching bolts whereby said coupling members may be adjusted, said coupling members having chain attaching holes disposed at their outer lower corners.

2. In a structure of the class described, the combination of a yoke adapted to embrace a felly, the arms of said yoke being provided with outwardly projecting lugs providing coupling member seats between them, coupling member attaching bolts arranged through said lugs, and tread chain coupling members adjustable in said seats and provided with a plurality of holes for said bolts whereby they may be adjustably secured to the yoke.

In witness whereof I have hereunto set my hand and seal in the presence of two witnesses.

CHAUNCEY W. HODGES. [L. S.]

Witnesses:
   B. F. BARENDSEN,
   JESSE H. ECKERT.